United States Patent
Kuo (10) Patent No.: US 9,613,392 B2
(45) Date of Patent: Apr. 4, 2017

(54) METHOD FOR PERFORMING GRAPHICS PROCESSING OF A GRAPHICS SYSTEM IN AN ELECTRONIC DEVICE WITH AID OF CONFIGURABLE HARDWARE, AND ASSOCIATED APPARATUS

(71) Applicant: MEDIATEK INC., Hsin-Chu (TW)

(72) Inventor: Yu-Ting Kuo, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 204 days.

(21) Appl. No.: 14/475,593

(22) Filed: Sep. 3, 2014

(65) Prior Publication Data

US 2016/0063663 A1 Mar. 3, 2016

(51) Int. Cl.
| | |
|---|---|
| *G06T 1/00* | (2006.01) |
| *G06T 1/20* | (2006.01) |
| *G06T 11/40* | (2006.01) |
| *G06T 15/00* | (2011.01) |

(52) U.S. Cl.
CPC ............. *G06T 1/20* (2013.01); *G06T 11/40* (2013.01); *G06T 15/005* (2013.01)

(58) Field of Classification Search
CPC ................................ G06T 1/20; G06T 15/005
See application file for complete search history.

(56) References Cited

U.S. PATENT DOCUMENTS

| | | | | |
|---|---|---|---|---|
| 2005/0110792 | A1* | 5/2005 | Morein | G06T 15/005 345/501 |
| 2005/0243094 | A1* | 11/2005 | Patel | G06T 15/005 345/506 |
| 2008/0235316 | A1* | 9/2008 | Du | G06T 15/005 708/513 |
| 2009/0189896 | A1* | 7/2009 | Jiao | G06T 1/60 345/426 |
| 2013/0135329 | A1* | 5/2013 | Seetharamaiah | G06T 15/005 345/522 |
| 2014/0292756 | A1* | 10/2014 | Mantor | G06T 15/005 345/426 |

* cited by examiner

*Primary Examiner* — Charles Tseng
(74) *Attorney, Agent, or Firm* — Winston Hsu; Scott Mango (57) ABSTRACT

A method for performing graphics processing of a graphics system in an electronic device and an associated apparatus are provided, where the method includes the steps of: configuring a configurable hardware of the graphics system to be a vertex processing (VP) path in a specific processing phase; utilizing the VP path to perform VP-related tile-based rendering (TBR) operations; configuring the configurable hardware of the graphics system to be a pixel processing (PP) path in another processing phase; and utilizing the PP path to perform PP-related TBR operations. For example, after performing VP-related TBR operations of a specific frame of a plurality of frames is completed, PP-related TBR operations of the specific frame are performed, where after performing the PP-related TBR operations of the specific frame is completed, VP-related TBR operations of another frame of the plurality of frames are performed.

18 Claims, 8 Drawing Sheets

FIG. 8

METHOD FOR PERFORMING GRAPHICS PROCESSING OF A GRAPHICS SYSTEM IN AN ELECTRONIC DEVICE WITH AID OF CONFIGURABLE HARDWARE, AND ASSOCIATED APPARATUS

BACKGROUND

The present invention relates to the internal circuitry of a graphics processing unit (GPU), and more particularly, to a method for performing graphics processing (e.g. tile-based rendering (TBR), etc.) of a graphics system in an electronic device, and an associated apparatus.

A conventional portable electronic device such as a conventional mobile phone may have a processor (e.g. a central processing unit (CPU)) to control operations of the conventional portable electronic device, and may further have a conventional GPU to perform graphics related calculations. According to the related art, the conventional GPU can be implemented to be suitable for the conventional TBR technologies. However, some problems such as some side effects may occur. For example, in comparison with the conventional immediate rendering technologies, the conventional TBR technologies require extra hardware costs. In another example, in comparison with the conventional immediate rendering technologies, the conventional TBR technologies need extra memory allocation. Thus, a novel architecture is required for reducing the hardware complexity and cost, as well as saving memory usage and bandwidth.

SUMMARY

It is therefore an objective of the claimed invention to provide a method for performing graphics processing (e.g. tile-based rendering (TBR), etc.) of a graphics system in an electronic device, and an associated apparatus, in order to solve the above-mentioned problems.

It is another objective of the claimed invention to provide a method for performing graphics processing (e.g. TBR, etc.) of a graphics system in an electronic device, and an associated apparatus, in order to enhance the overall performance of the electronic device without introducing any side effect.

According to at least one preferred embodiment, a method for performing graphics processing (e.g. TBR, etc.) of a graphics system in an electronic device is provided, where the method comprises the steps of: configuring a configurable hardware (i.e. a configurable hardware circuit) of the graphics system to be a vertex processing (VP) path in a specific processing phase; utilizing the VP path to perform VP-related TBR operations; configuring the configurable hardware of the graphics system to be a pixel processing (PP) path in another processing phase; and utilizing the PP path to perform PP-related TBR operations.

According to at least one preferred embodiment, an apparatus for performing graphics processing (e.g. TBR, etc.) of a graphics system in an electronic device is also provided, where the apparatus comprises at least one portion of the electronic device. The apparatus comprises a configurable hardware (i.e. a configurable hardware circuit) and a control circuit that is coupled to the configurable hardware. In addition, the configurable hardware is arranged for performing TBR operations. Additionally, the control circuit is arranged for configuring the configurable hardware of the graphics system to be a VP path in a specific processing phase, utilizing the VP path to perform VP-related TBR operations, configuring the configurable hardware of the graphics system to be a PP path in another processing phase, and utilizing the PP path to perform PP-related TBR operations.

It is an advantage of the present invention that the present invention method and the associated apparatus can enhance the overall performance of the electronic device without introducing any side effect. In addition, in comparison with the related art, the present invention method and the associated apparatus can prevent the related art problems (e.g. the problem of extra hardware costs, and the problem of extra memory allocation). More particularly, the present invention method and the associated apparatus are capable of reducing the hardware complexity and cost, as well as saving memory usage and bandwidth.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
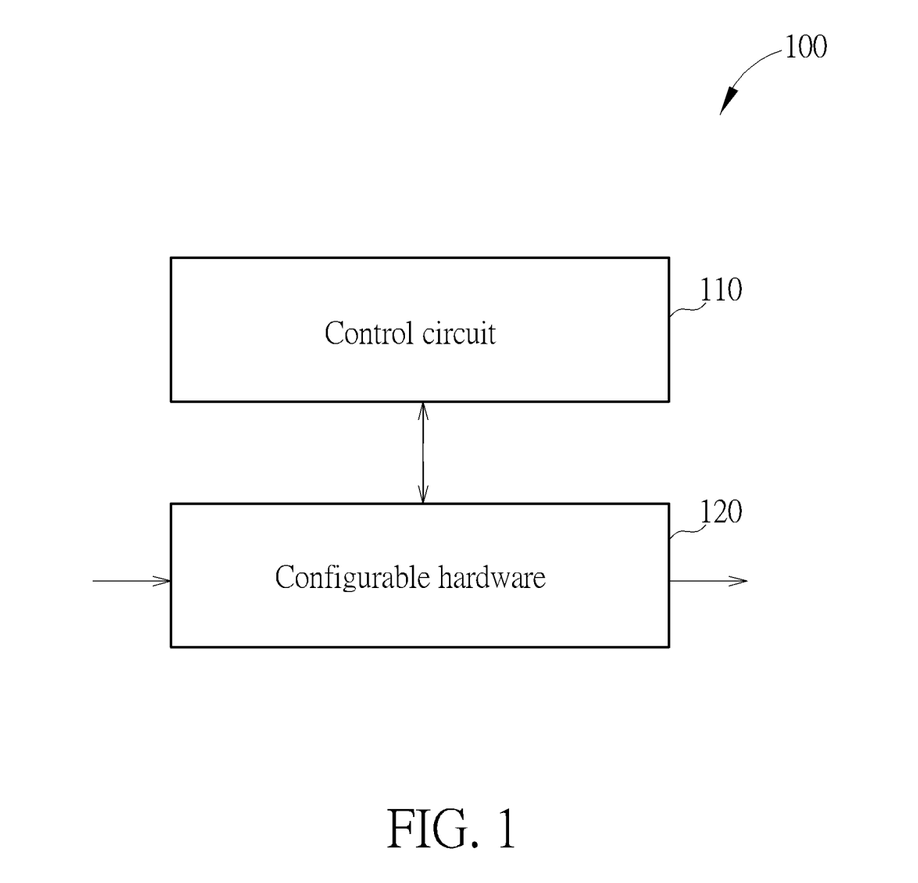
FIG. 1 is a diagram of an apparatus for performing graphics processing (e.g. tile-based rendering (TBR), etc.) of a graphics system in an electronic device according to an embodiment of the present invention.

FIG. 1 is a diagram of an apparatus for performing graphics processing (e.g. tile-based rendering (TBR), etc.) of a graphics system in an electronic device according to an embodiment of the present invention, where the apparatus 100 may comprise at least one portion (e.g. a portion or all) of the electronic device. For example, the apparatus 100 may comprise a portion of the electronic device, and more particularly, can be at least one hardware circuit such as at least one integrated circuit (IC) within the electronic device. In another example, the apparatus 100 can be the whole of the electronic device. In another example, the apparatus 100 may comprise a system comprising the electronic device (e.g. an audio/video system comprising the electronic device). Examples of the electronic device may include, but not limited to, a mobile phone (e.g. a multifunctional mobile phone), a personal digital assistant (PDA), and a personal computer such as a laptop computer. Please note that, examples of the graphics system may include, but not limited to, a graphics processing unit (GPU).

As shown in FIG. 1, the apparatus 100 may comprise a control circuit 110 such as a command engine of the graphics system (e.g. a command engine within the GPU), and may further comprise a configurable hardware 120 (more particularly, a configurable hardware circuits of the graphics system, such as a multifunctional hardware circuit that can be configured to be different functional hardware circuits within the GPU), where the control circuit 110 and the configurable hardware 120 are coupled to each other. The control circuit 110 is arranged for controlling the apparatus 100 to operate in a plurality of modes, respectively. For example, the plurality of modes may comprise a TBR mode, and in the TBR mode, the apparatus 100 is capable of performing TBR according to a novel method such as that of the embodiment shown in FIG. 2. This is for illustrative purposes only, and is not meant to be a limitation of the present invention. In some examples, the plurality of modes may further comprise an immediate rendering (IMM) mode. In the IMM mode, the graphics system will render the 3D scene primitive-by-primitive (i.e. triangle-by-triangle). In the TBR mode, the graphics system will render the 3D scene bin-by-bin (i.e. tile-by-tile).

More particularly, in any mode within the TBR mode and the (IMM) mode, the control circuit 110 can selectively configure the apparatus 100 into at least one corresponding configuration (e.g. one or more corresponding configurations). For example, in the TBR mode, the control circuit 110 can selectively configure the apparatus 100 into a vertex processing (VP) configuration or a pixel processing (PP) configuration, where the configurable hardware 120 can be arranged for performing TBR operations. As a result, the apparatus 100 that is configured into the VP configuration in a specific processing phase is capable of performing some operations, while the apparatus 100 that is configured into the PP configuration in another processing phase is capable of performing some other operations. This is for illustrative purposes only, and is not meant to be a limitation of the present invention.

In some examples, in the IMM mode, the control circuit 110 can selectively configure the apparatus 100 into at least one corresponding configuration (e.g. one or more corresponding configurations). For example, in the IMM mode, the control circuit 110 can selectively configure the apparatus 100 into an IMM configuration, where the configurable hardware 120 can be arranged for performing IMM operations. As a result, the apparatus 100 that is configured into the IMM configuration is capable of performing IMM operations.

According to some embodiments, in the TBR mode, the control circuit 110 is arranged for configuring the configurable hardware 120 of the graphics system to be a VP path in the specific processing phase, and is arranged for utilizing the VP path to perform some VP-related TBR operations (i.e. some TBR operations that are related to VP, which may be performed with aid of the VP configuration), and is further arranged for configuring the configurable hardware 120 of the graphics system to be a PP path in the other processing phase, and is arranged for utilizing the PP path to perform some PP-related TBR operations (i.e. some TBR operations that are related to PP, which may be performed with aid of the PP configuration). Under control of the control circuit 110, the apparatus 100 may perform graphics processing frame by frame, where a frame may comprise a plurality of pixels. For example, after performing VP-related TBR operations of a specific frame of a plurality of frames (e.g. a frame F0) is completed, PP-related TBR operations of the specific frame are performed, where after performing the PP-related TBR operations of the specific frame is completed, VP-related TBR operations of another frame of the plurality of frames (e.g. a frame F1) are performed. More particularly, after performing the VP-related TBR operations of the other frame of the plurality of frames (e.g. the frame F1) is completed, PP-related TBR operations of the other frame are performed, where after performing the PP-related TBR operations of the other frame is completed, VP-related TBR operations of yet another frame of the plurality of frames (e.g. a frame F2) are performed.

According to some embodiments, the configurable hardware 120 may comprise a vertex loader, a plurality of unified shaders, a culling unit, a clipping and setup unit, a unified rasterizer, a binning processor, and a shared cache (which are not shown in FIG. 1) that are arranged for performing the TBR operations. For example, the vertex loader can be used to load vertices of at least one primitive (e.g. at least one triangle), a shader of the plurality of unified shaders can be used to perform shading operations, such as the operations of producing appropriate levels of color within an image, the culling unit can be used to eliminate back-faced triangles, the clipping and setup unit can be used to clip triangles and perform associated settings, the unified rasterizer can be used to identify bins or pixels covered by a triangle (depending on the operation mode), the binning processor can be used to perform binning operations (which will be explained later), and the shared cache can be used to cache data.

In some of these embodiments, in a situation where the configurable hardware 120 is configured to be the VP path in the specific processing phase, the VP path may start from a vertex buffer within the electronic device, and may pass through the vertex loader, the plurality of unified shaders, the culling unit, the clipping and setup unit, the unified rasterizer, and the binning processor, and may further reach a bin buffer within the electronic device. For example, the vertex buffer and the bin buffer can be external memory buffers of the graphics system, where the external memory buffers can be implemented by at least one dynamic random access memory (DRAM) within the electronic device, such as one or more DRAMs within the electronic device. This is for illustrative purposes only, and is not meant to be a limitation of the present invention.

According to some others of these embodiments, in a situation where the configurable hardware 120 is configured to be the PP path in the other processing phase, the PP path may start from the bin buffer, and may pass through the binning processor, the clipping and setup unit, the unified rasterizer, and the plurality of unified shaders, and may further reach another buffer within the electronic device, such as a pixel buffer within the electronic device. For example, the bin buffer and the pixel buffer can be external memory buffers of the graphics system, where the external memory buffers can be implemented by the aforementioned at least one DRAM within the electronic device, such as the aforementioned one or more DRAMs within the electronic device. This is for illustrative purposes only, and is not meant to be a limitation of the present invention.

According to some embodiments, in a situation where the graphics system is a GPU, the configurable hardware 120 can be a GPU hardware circuit.

Figure 2:
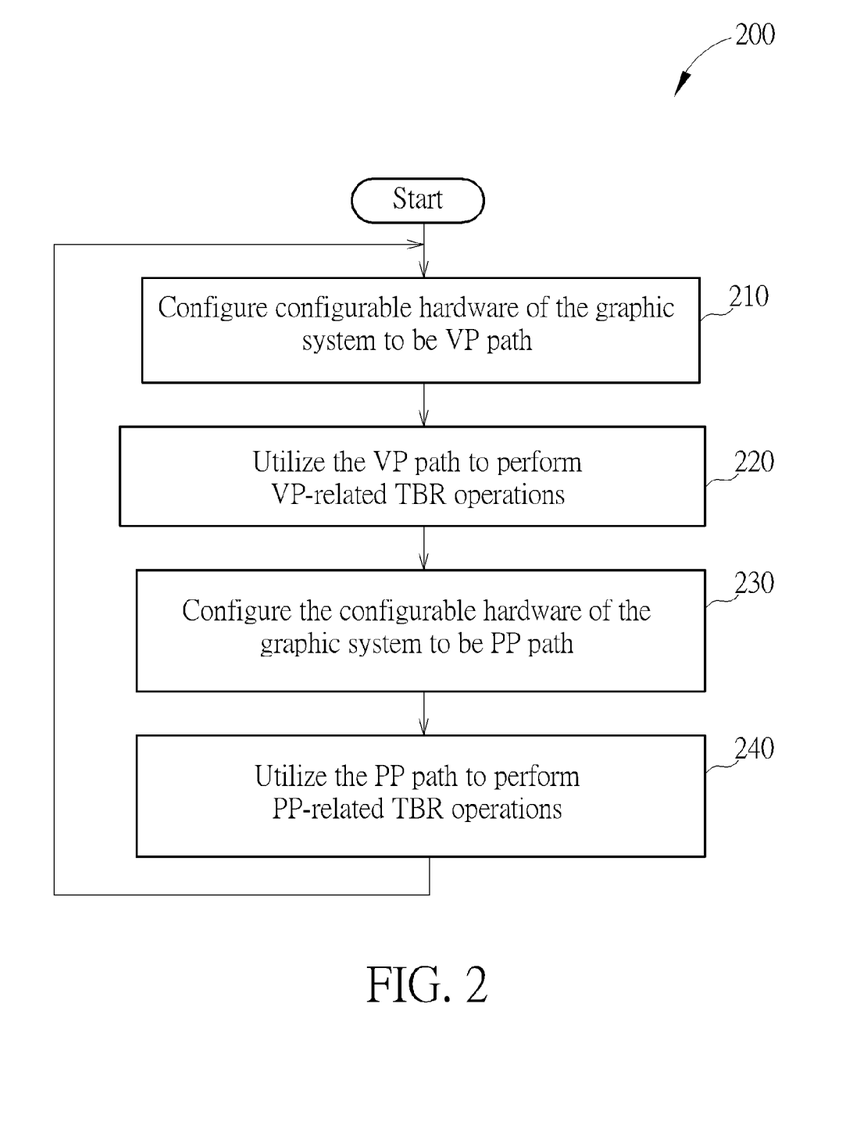
FIG. 2 illustrates a flowchart of a method for performing graphics processing (e.g. TBR, etc.) of a graphics system in an electronic device according to an embodiment of the present invention.

FIG. 2 illustrates a flowchart of a method 200 for performing graphics processing (e.g. TBR, etc.) of a graphics system in an electronic device, such as the aforementioned graphics system in the electronic device, according to an embodiment of the present invention. The method 200 can be applied to the apparatus 100 shown in FIG. 1, and can be applied to the control circuit 110 and the configurable hardware 120 thereof. The method can be described as follows.

In Step 210, the control circuit 110 configures the configurable hardware 120 of the graphics system to be the VP path, where the configurable hardware 120 may be configured to be the VP path in a processing phase (e.g. the specific processing phase). More particularly, during processing the specific frame, the control circuit 110 configures the configurable hardware 120 of the graphics system to be the VP path.

In Step 220, the control circuit 110 utilizes the VP path to perform the VP-related TBR operations. More particularly, during processing the specific frame, the control circuit 110 utilizes the VP path to perform the VP-related TBR operations of the specific frame.

In Step 230, the control circuit 110 configures the configurable hardware 120 of the graphics system to be the PP path, where the configurable hardware 120 may be configured to be the PP path in a processing phase that is different from the processing phase mentioned in the description of Step 210 (e.g., in the other processing phase). More particularly, during processing the specific frame, the control circuit 110 temporarily configures the configurable hardware 120 of the graphics system to be the PP path.

In Step 240, the control circuit 110 utilizes the PP path mentioned in Step 230 to perform the PP-related TBR operations. More particularly, during processing the specific frame, the control circuit 110 utilizes the PP path to perform the PP-related TBR operations of the specific frame.

In practice, the TBR operations of each frame of the plurality of frames can be divided into two passes, i.e. the VP pass and the PP pass, where the VP pass is taken as the first pass for this frame, and the PP pass is taken as the second pass for this frame. Thus, the TBR operations in the VP pass of this frame can be regarded as the VP-related TBR operations of this frame, and the TBR operations in the PP pass of this frame can be regarded as the PP-related TBR operations of this frame.

Typically, the TBR operations in the VP pass of this frame (e.g. the aforementioned each frame of the plurality of frames) may comprise: calculating the positions and the varyings for all vertices in this frame, determining the associations between primitives (such as triangles) and bins in this frame, and writing the above data (e.g. the positions and the varyings for all of the vertices in this frame, and the associations between the primitives and the bins in this frame) to the bin buffer. In addition, the TBR operations in the PP pass of this frame (e.g. the aforementioned each frame of the plurality of frames) may comprise: for each bin of the bins of this frame (or each tile of the tiles of this frame), rendering the primitives within the current bin (e.g. the aforementioned each bin). As a result, all of the primitives of this frame can be drawn bin by bin.

For example, the operations of Step 210, Step 220, Step 230, and Step 240 can be performed for the specific frame (e.g. the frame F0), and therefore the VP-related TBR operations mentioned in Step 220 may comprise the TBR operations in the VP pass of the specific frame (e.g. calculating the positions and the varyings for all vertices in the specific frame, determining the associations between primitives and bins in the specific frame, and writing the above data to the bin buffer) and the PP-related TBR operations mentioned in Step 240 may comprise the TBR operations in the PP pass of the specific frame (e.g. for each bin of the bins of the specific frame, rendering the primitives within the current bin). In another example, the operations of Step 210, Step 220, Step 230, and Step 240 can be performed for the other frame (e.g. the frame F1), and therefore the VP-related TBR operations mentioned in Step 220 may comprise the TBR operations in the VP pass of the other frame (e.g. calculating the positions and the varyings for all vertices in the other frame, determining the associations between primitives and bins in the other frame, and writing the above data to the bin buffer) and the PP-related TBR operations mentioned in Step 240 may comprise the TBR operations in the PP pass of the other frame (e.g. for each bin of the bins of the other frame, rendering the primitives within the current bin).

As shown in FIG. 2, after the operation of Step 240 is performed, Step 210 can be re-entered. Thus, the operations of Step 210, Step 220, Step 230, and Step 240 can be performed frame by frame, and more particularly, can be performed by using the loop formed with Step 210, Step 220, Step 230, and Step 240. For example, the operations of Step 210, Step 220, Step 230, and Step 240 can be performed for the specific frame (e.g. the frame F0). In another example, the operations of Step 210, Step 220, Step 230, and Step 240 can be performed for another frame of the plurality of frames (e.g. the frame F1).

As a result, during processing the other frame (e.g. the frame F1), the control circuit 110 configures the configurable hardware 120 of the graphics system to be the VP path (e.g. in Step 210) in a processing phase of processing the other frame. In addition, during processing the other frame, the control circuit 110 utilizes the VP path to perform VP-related TBR operations of the other frame (e.g. in Step 220). Additionally, during processing the other frame, the control circuit 110 configures the configurable hardware 120 of the graphics system to be the PP path (e.g. in Step 230) in a different processing phase of processing the other frame. Further, during processing the other frame, the control circuit 110 utilizes the PP path to perform PP-related TBR operations of the other frame (e.g. in Step 240).

According to this embodiment, the VP-related TBR operations mentioned in Step 220 may comprise vertex computation operations, and may further comprise tiling or binning operations, and the PP-related TBR operations mentioned in Step 240 may comprise pixel computation operations. More particularly, each frame of the plurality of frames can be divided into multiple tiles (which can be referred to as bins in this embodiment and some other embodiments), where some rendering operations of the aforementioned each frame of the plurality of frames can be performed bin by bin. Typically, the operation of binning (or the operation of tiling) may comprise dividing the whole region of a frame (e.g. the whole region corresponding to a screen) into multiple bins such as multiple rectangular regions and performing calculation to determine which bin(s) are involved with a primitive (e.g. a triangle) being processed. In a situation where the triangle is taken as an example of the primitive, coefficients of edge equations of the triangle may be determined. For example, all of the primitives (e.g. triangles) in the first bin of a frame can be drawn first. Afterward, similar operations can be applied to the next bin (e.g. all of the primitives such as some triangles in the next bin of this frame can be drawn next), and similar operations can be applied to another bin, and so on.

Please note that the working flow shown in FIG. 2 is illustrated with the loop formed with Step 210, Step 220, Step 230, and Step 240. This is for illustrative purposes only, and is not meant to be a limitation of the present invention. According to some embodiments, it is unnecessary that Step 210 is re-entered after the operation of Step 240 is performed. For example, after the operations of Step 210, Step 220, Step 230, and Step 240 are performed for the specific frame, the control circuit 110 may control the apparatus 100 to switch to the IMM mode, and may selectively configure the apparatus 100 into the IMM configuration, where the configurable hardware 120 can be arranged for performing the IMM operations for one or more other frames (e.g. one or more subsequent frame(s) in this example).

According to some embodiments, it is unnecessary that Step 210 is immediately re-entered after the operation of Step 240 is performed. For example, the control circuit 110 may control the apparatus 100 to switch between the TBR mode and the IMM mode. More particularly, after the operations of Step 210, Step 220, Step 230, and Step 240 are performed for the specific frame, the control circuit 110 may control the apparatus 100 to switch to the IMM mode and may configure the apparatus 100 into the IMM configuration, where the configurable hardware 120 can be arranged for performing the IMM operations for one or more other frames (e.g. one or more subsequent frame(s) in this example). Afterward, the control circuit 110 may control the apparatus 100 to switch to the TBR mode, and therefore Step 210 can be re-entered, in order to perform the operations of Step 210, Step 220, Step 230, and Step 240 for one of the plurality of frames, such as the other frame.

Figure 3:
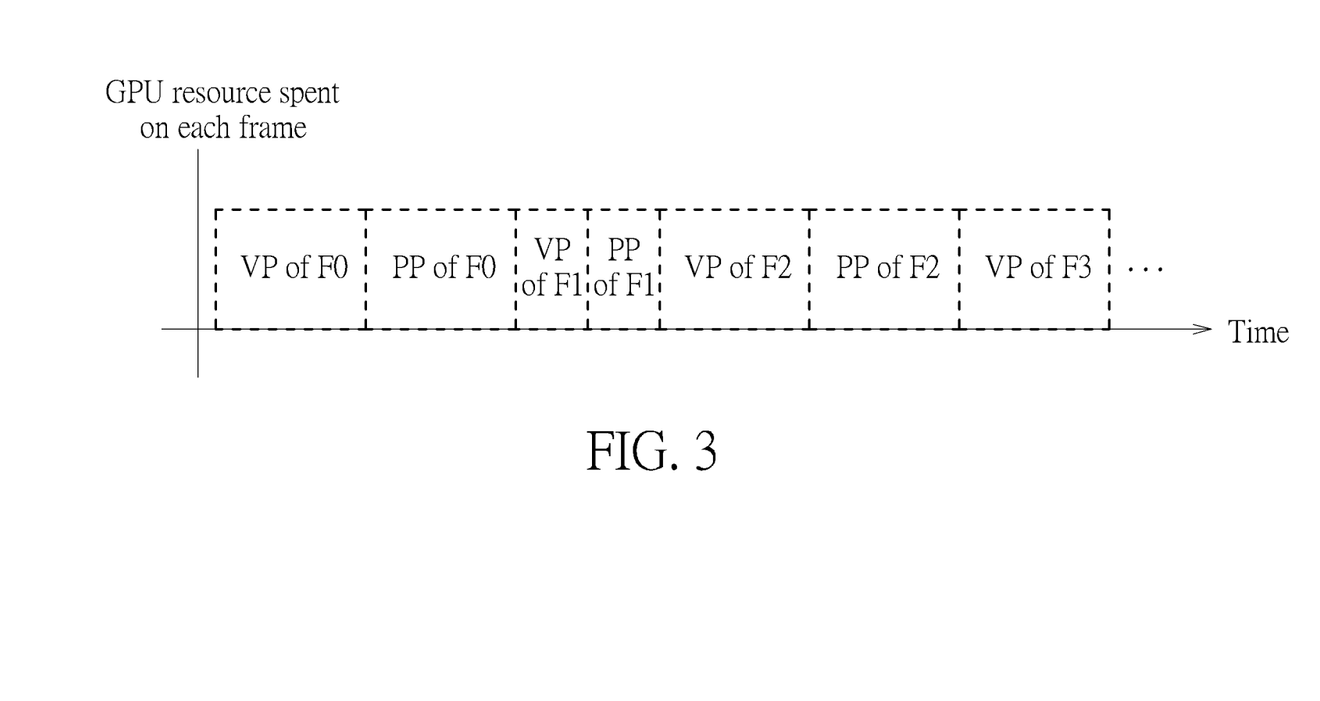
FIG. 3 illustrates a TBR control scheme involved with the method shown in FIG. 2 according to an embodiment of the present invention.

FIG. 3 illustrates a TBR control scheme involved with the method 200 shown in FIG. 2 according to an embodiment of the present invention. The horizontal axis may represent the time, and the vertical axis may represent the GPU resources spent on each frame. According to this embodiment, in the processing of the specific frame, after performing the VP-related TBR operations is completed, the PP-related TBR operations can be performed, where after performing the PP-related TBR operations of the specific frame is completed, the VP-related TBR operations of another frame can be performed. More particularly, after performing the VP-related TBR operations of the other frame of the plurality of frames is completed, the PP-related TBR operations of the other frame can be performed, where after performing the PP-related TBR operations of the other frame is completed, the VP-related TBR operations of yet another frame of the plurality of frames can be performed. Namely, for a graphics system, the VP-related TBR operation of a specific frame and the PP-related TBR operation of another frame are not performed at a same time.

For example, the specific frame may represent the frame F0 within a series of frames {F0, F1, F2, F3, ... }, which can be taken as an example of the plurality of frames. Thus, after performing the VP-related TBR operations of the frame F0 (labeled "VP of F0" in FIG. 3, for better comprehension) is completed, the PP-related TBR operations of the frame F0 (labeled "PP of F0" in FIG. 3, for better comprehension) can be performed. In addition, after performing the PP-related TBR operations of the frame F0 is completed, the VP-related TBR operations of the frame F1 (labeled "VP of F1" in FIG. 3, for better comprehension) can be performed. Additionally, after performing the VP-related TBR operations of the frame F1 is completed, the PP-related TBR operations of the frame F1 (labeled "PP of F1" in FIG. 3, for better comprehension) can be performed. Further, after performing the PP-related TBR operations of the frame F1 is completed, the VP-related TBR operations of the frame F2 (labeled "VP of F2" in FIG. 3, for better comprehension) can be performed. Similarly, after performing the VP-related TBR operations of the frame F2 is completed, the PP-related TBR operations of the frame F2 (labeled "PP of F2" in FIG. 3, for better comprehension) can be performed. In addition, after performing the PP-related TBR operations of the frame F2 is completed, the VP-related TBR operations of the frame F3 (labeled "VP of F3" in FIG. 3, for better comprehension) can be performed.

Please note that any TBR operation of the specific frame and any TBR operation of the other frame are not performed at the same time. Thus, it is unnecessary to prepare two bin buffer regions suggested by the conventional TBR technologies, such as both of a first bin buffer region for accessing data of one frame and a second bin buffer region for accessing data of another frame, since the apparatus 100 does not have to process two frames at the same time. In comparison with the conventional TBR technologies that need two bin buffer regions respectively corresponding two frames, the method 200 and the associated apparatus 100 can save hardware resources, and more particularly, can reduce the bin buffer size or buffer bandwidth requirement.

Figure 4:
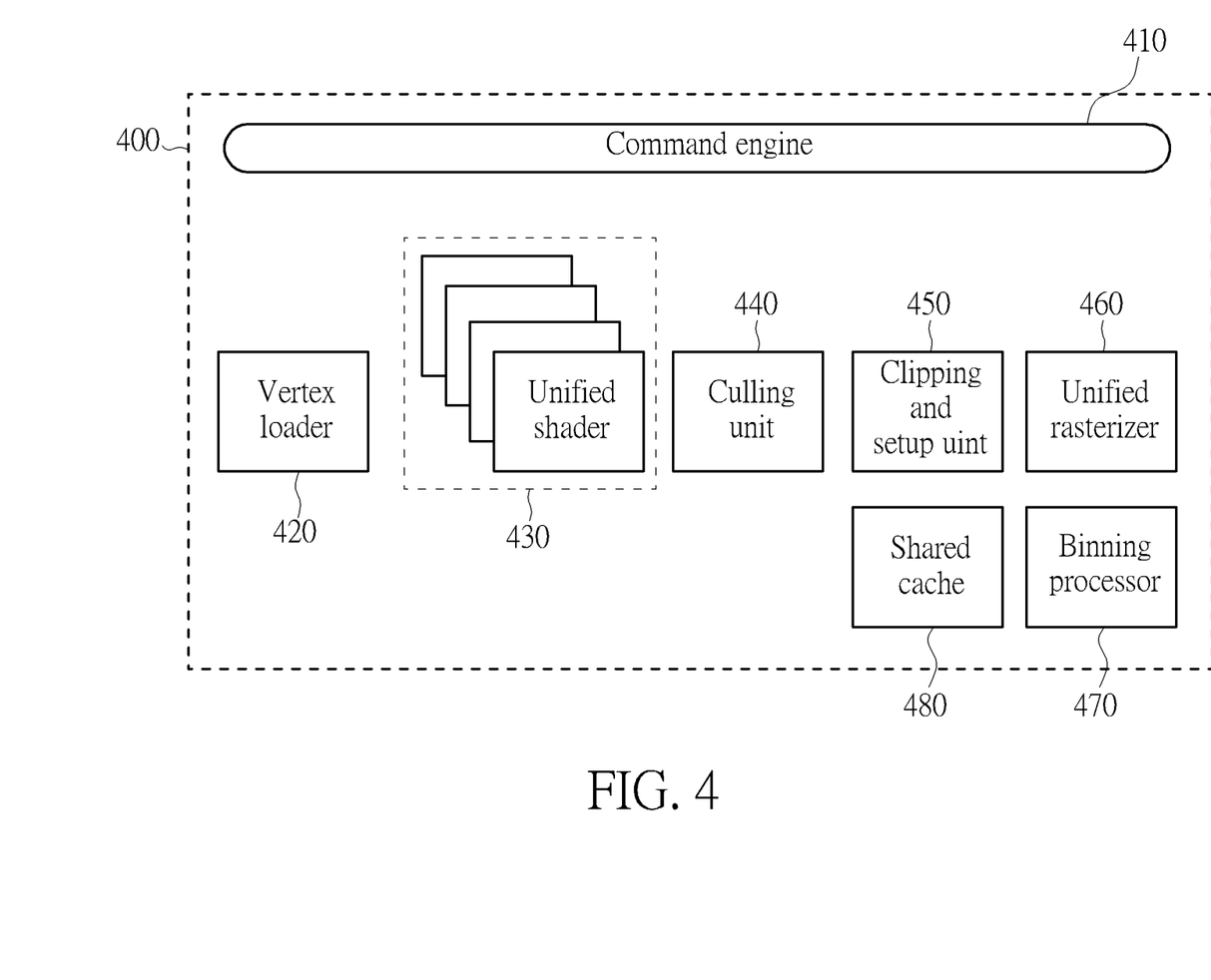
FIG. 4 illustrates a block diagram of the configurable hardware involved with the method shown in FIG. 2 according to an embodiment of the present invention.

FIG. 4 illustrates a block diagram of the configurable hardware involved with the method 200 shown in FIG. 2 according to an embodiment of the present invention, where the graphics system 400 shown in FIG. 4 can be taken as an example of the graphics system.

As shown in FIG. 4, the graphics system 400 may comprise a command engine 410, a vertex loader 420, a plurality of unified shaders 430, a culling unit 440, a clipping and setup unit 450, a unified rasterizer 460, a binning processor 470, and a shared cache 480. More particularly, any shader of the plurality of unified shaders 430 may be selectively configured to be a vertex shader (VS) for performing vertex shading, or may be selectively configured to be a pixel shader (PS) for performing pixel shading. In addition, the unified rasterizer 460 may be selectively configured to be a bin rasterizer 460BIN (not shown in FIG. 4) for performing bin rasterizing operations, or may be selectively configured to be a pixel rasterizer 460PIXEL (not shown in FIG. 4) for performing pixel rasterizing operations.

Please note that the command engine 410 can be taken as an example of the control circuit 110 shown in FIG. 1. In addition, the vertex loader 420, the plurality of unified shaders 430, the culling unit 440, the clipping and setup unit 450, the unified rasterizer 460, the binning processor 470, and the shared cache 480 can be taken as an example of those mentioned in some embodiments described between the embodiment shown in FIG. 1 and the embodiment shown in FIG. 2. For example, the configurable hardware 120 of this embodiment may comprise the vertex loader 420, the plurality of unified shaders 430, the culling unit 440, the clipping and setup unit 450, the unified rasterizer 460, the binning processor 470, and the shared cache 480 shown in FIG. 4, where the binning processor 470 may handle the bin data loading operations (e.g. the loading operations of the bin data) and the bin data storing operations (e.g. the storing operations of the bin data).

In practice, the command engine 410 can be utilized for controlling the graphics system in response to commands sent from a processor such as a Central Processing Unit (CPU). Under control of the command engine 410, the vertex loader 420 may fetch vertices data from an external memory buffer (e.g. a DRAM). Within the plurality of unified shaders 430, a unified shader may execute a program code such as a shader code to calculate color data. For example, the shader code may be used for describing each vertex of a set of vertices, and therefore this unified shader may calculate color data of the corresponding vertices. In addition, the culling unit 440 may perform culling operations to eliminate back-faced primitives (e.g. back-faced triangles). For example, when illustrating a three dimensional (3D) object is required, the coordinates of three vertices of a triangle may be described in a clockwise order or a counterclockwise order, which may correspond to a normal vector. When the normal vector is determined to be directed away from the viewer, this triangle can be regarded as a back-face triangle. In this situation, the culling unit 440 may eliminate this triangle.

With regard to the clipping and setup unit 450, for example, a portion of a triangle may be positioned outside a viewing region, and the clipping and setup unit 450 may cut and discard this portion of this triangle, and may generate new vertices of the locations where the cutting operation is applied. In another example, the clipping and setup unit 450 may calculate a bounding box for a triangle and associated information of edge equations (which may be used for describing the edges of the triangle), for being used by the unified rasterizer 460. Additionally, the operations of the unified rasterizer 460 may vary in different modes. For example, in the IMM mode, the unified rasterizer 460 may determine which triangle(s) need to be processed currently, and may send the associated pixel data to a pixel shader. In another example, in the TBR mode, the unified rasterizer 460 may determine which bin(s) are involved with the triangle to be processed currently, and may write the associated vertex data into the bin buffer. This is for illustrative purposes only, and is not meant to be a limitation of the present invention.

Based upon the architecture shown in FIG. 4, the types of the elements shown in graphics system 400 can support both IMM and TBR by different operation procedures. More particularly, under operation of the control circuit 110 such as the command engine 410, the graphics system 400 may operate in a race-to-complete manner in any pass of two passes (such as the first pass and the second pass) of any frame within the plurality of frames (e.g. the aforementioned VP pass of each frame, or the aforementioned PP pass of each frame), and therefore can reduce the associated hardware cost in comparison with the related art. Thus, the graphics system 400 is equipped with a compact hardware. In a situation where the graphics system 400 is a GPU, the configurable hardware 120 of this embodiment can be regarded as a compact GPU hardware.

Figure 5:
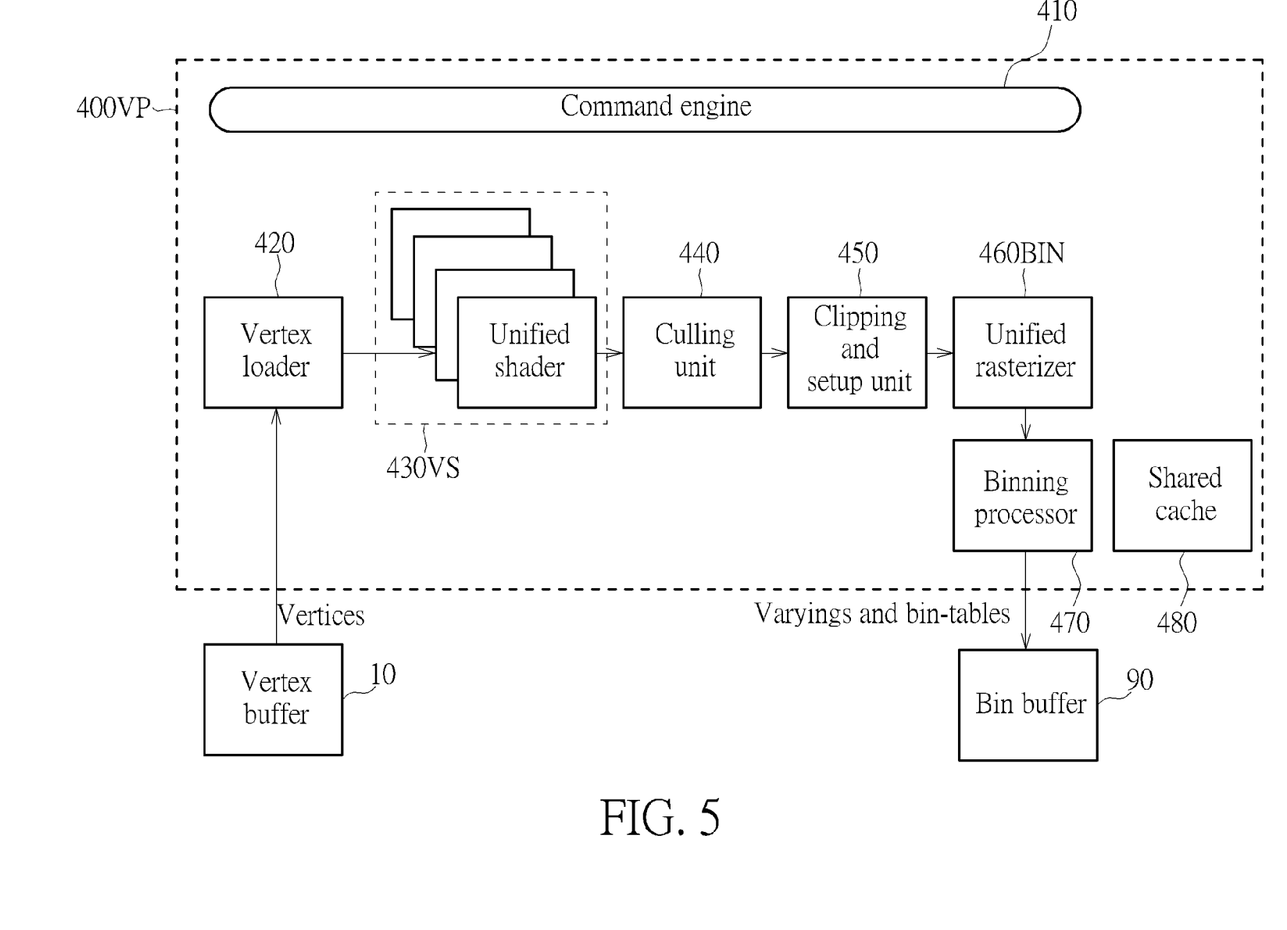
FIG. 5 illustrates a VP configuration involved with the method shown in FIG. 2 according to an embodiment of the present invention.

FIG. 5 illustrates a VP configuration 400VP involved with the method 200 shown in FIG. 2 according to an embodiment of the present invention, where under control of the control circuit 110 such as the command engine 410, the graphics system 400 can be configured into the VP configuration 400VP. The vertex buffer 10 and the bin buffer 90 shown in FIG. 5 can be taken as an example of those mentioned in some embodiments described between the embodiment shown in FIG. 1 and the embodiment shown in FIG. 2, respectively.

As shown in FIG. 5, the plurality of unified shaders 430 that is configured to be a set of VSs in this embodiment can be referred to as the plurality of unified shaders 430VS, and the unified rasterizer 460 that is configured to be a bin rasterizer in this embodiment can be referred to as the unified rasterizer 460BIN. In addition, in a situation where the configurable hardware 120 of this embodiment is configured to be the VP path mentioned in Step 210, the VP path may start from the vertex buffer 10, and may pass through the vertex loader 420, the plurality of unified shaders 430VS, the culling unit 440, the clipping and setup unit 450, the unified rasterizer 460BIN, and the binning processor 470, and may further reach the bin buffer 90. For example, the vertex buffer 10 and the bin buffer 90 can be external memory buffers of the graphics system 400, where the external memory buffers can be implemented by the aforementioned at least one DRAM within the electronic device, such as the aforementioned one or more DRAMs within the electronic device. This is for illustrative purposes only, and is not meant to be a limitation of the present invention.

According to this embodiment, the vertex loader 420 is arranged for loading vertices of primitives such as triangles from the vertex buffer 10, and the plurality of unified shaders 430VS is arranged for performing vertex shading. In addition, the culling unit 440 is arranged for performing culling operations (e.g. discarding unwanted information behind an object), and the clipping and setup unit 450 is arranged for performing clipping or setup operations (e.g. clipping along a boundary, or performing calculations for the coefficients of edge equations of a triangle). Additionally, the unified rasterizer 460BIN is arranged for performing bin rasterizing operations, and the binning processor 470 is arranged for storing the bin data (e.g. varyings and bin-tables) into the bin buffer 90. Further, the shared cache 480 can be configured to be suitable for the operations of the VP configuration 400VP, and more particularly, can be configured to comprise an attribute cache and a bin-table cache. For brevity, similar descriptions for this embodiment are not repeated in detail here.

Figure 6:
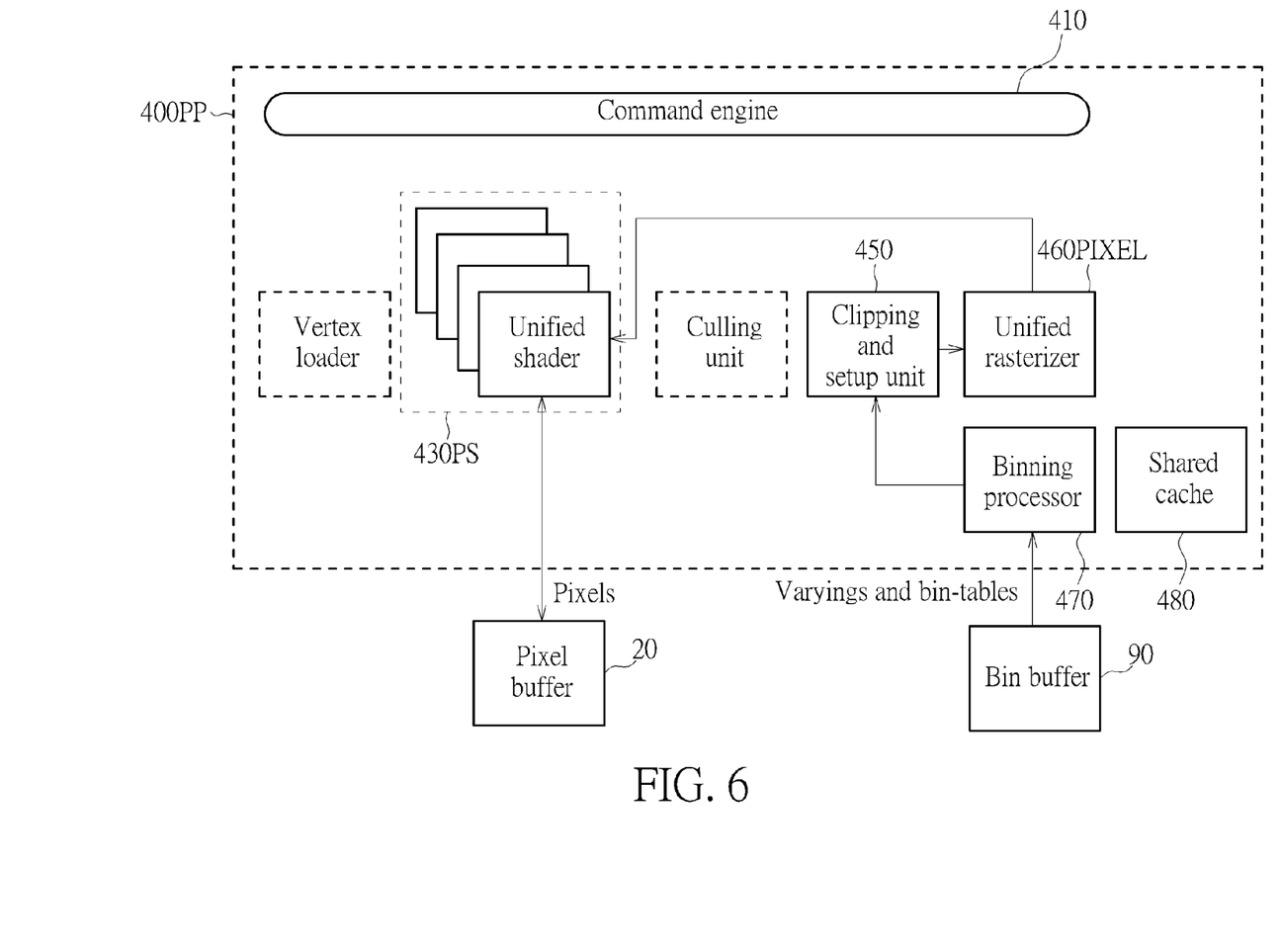
FIG. 6 illustrates a PP configuration involved with the method shown in FIG. 2 according to an embodiment of the present invention.

FIG. 6 illustrates a PP configuration 400PP involved with the method 200 shown in FIG. 2 according to an embodiment of the present invention, where under control of the control circuit 110 such as the command engine 410, the graphics system 400 can be configured into the PP configuration 400PP. The pixel buffer 20 can be referred to as the Color and Z buffer in this embodiment and some other embodiments, since the pixel buffer 20 can be utilized for storing color information and depth (Z) information. The pixel buffer 20 and the bin buffer 90 shown in FIG. 5 can be taken as an example of those mentioned in some embodiments described between the embodiment shown in FIG. 1 and the embodiment shown in FIG. 2, respectively.

As shown in FIG. 6, the plurality of unified shaders 430 that is configured to be a set of PSs in this embodiment can be referred to as the plurality of unified shaders 430PS, and the unified rasterizer 460 that is configured to be a pixel rasterizer in this embodiment can be referred to as the unified rasterizer 460PIXEL. In addition, in a situation where the configurable hardware 120 of this embodiment is configured to be the PP path mentioned in Step 230, the PP path may start from the bin buffer 90, and may pass through the binning processor 470, the clipping and setup unit 450, the unified rasterizer 460PIXEL, and the plurality of unified shaders 430PS, and may further reach the pixel buffer 20.

For example, the bin buffer 90 and the pixel buffer 20 can be external memory buffers of the graphics system 400, where the external memory buffers can be implemented by the aforementioned at least one DRAM within the electronic device, such as the aforementioned one or more DRAMs within the electronic device. This is for illustrative purposes only, and is not meant to be a limitation of the present invention.

According to this embodiment, the binning processor 470 is arranged for loading the bin data (e.g. varyings and bin-tables) from the bin buffer 90, and the clipping and setup unit 450 is arranged for performing clipping or setup operations (e.g. clipping along a boundary, or performing calculations for the coefficients of edge equations of a triangle). In addition, the unified rasterizer 460PIXEL is arranged for performing pixel rasterizing operations. Additionally, the plurality of unified shaders 430PS is arranged for performing pixel shading, in order to store pixel data (e.g. color information and depth (Z) information) into the pixel buffer 20. Further, the shared cache 480 can be configured to be suitable for the operations of the PP configuration 400PP, and more particularly, can be configured to comprise a varying cache, a depth cache, and a color cache. For brevity, similar descriptions for this embodiment are not repeated in detail here.

Figure 7:
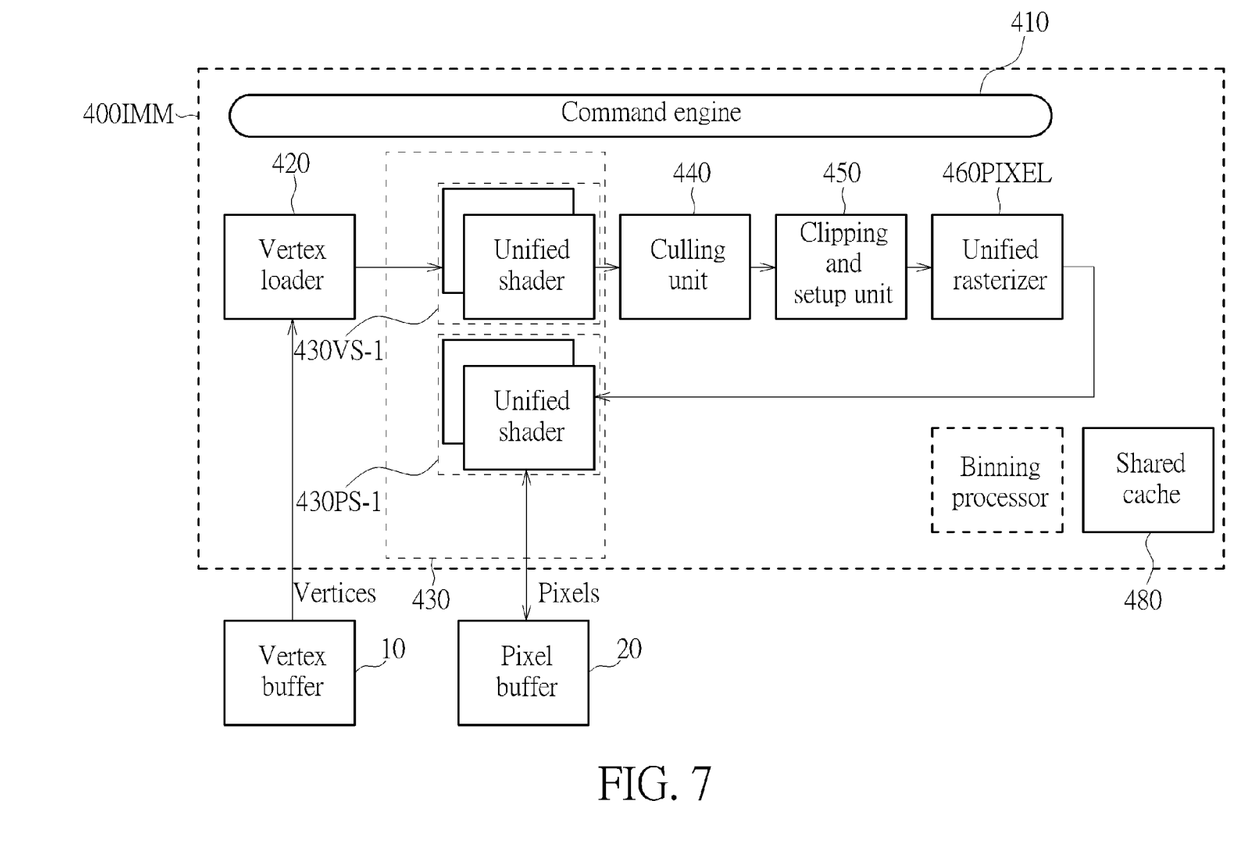
FIG. 7 illustrates an immediate rendering (IMM) configuration involved with the method shown in FIG. 2 according to an embodiment of the present invention.

FIG. 7 illustrates an IMM configuration 400IMM involved with the method 200 shown in FIG. 2 according to an embodiment of the present invention, where under control of the control circuit 110 such as the command engine 410, the graphics system 400 can be configured into the IMM configuration 400IMM. The vertex buffer 10 and the pixel buffer 20 shown in FIG. 7 can be taken as an example of those mentioned in some embodiments described between the embodiment shown in FIG. 1 and the embodiment shown in FIG. 2, respectively.

As shown in FIG. 7, a portion of unified shaders within the plurality of unified shaders 430 can be configured to be a set of VSs in this embodiment, and therefore can be referred to as the first set of unified shaders 430VS-1. In addition, another portion of unified shaders within the plurality of unified shaders 430 can be configured to be a set of PSs in this embodiment, and therefore can be referred to as the second set of unified shaders 430PS-1. Additionally, the unified rasterizer 460 that is configured to be a pixel rasterizer in this embodiment can be referred to as the unified rasterizer 460PIXEL. Further, in a situation where the configurable hardware 120 of this embodiment is configured to be an IMM path corresponding to the IMM configuration 400IMM, the IMM path may start from the vertex buffer 10, and may pass through the vertex loader 420, the first set of unified shaders 430VS-1, the culling unit 440, the clipping and setup unit 450, the unified rasterizer 460PIXEL, and the second set of unified shaders 430PS-1, and may further reach the pixel buffer 20. For example, the vertex buffer 10 and the pixel buffer 20 can be external memory buffers of the graphics system 400, where the external memory buffers can be implemented by the aforementioned at least one DRAM within the electronic device, such as the aforementioned one or more DRAMs within the electronic device. This is for illustrative purposes only, and is not meant to be a limitation of the present invention.

According to this embodiment, the vertex loader 420 is arranged for loading vertices of primitives such as triangles from the vertex buffer 10, and the first set of unified shaders 430VS-1 is arranged for performing vertex shading. In addition, the culling unit 440 is arranged for performing culling operations (e.g. discarding unwanted information behind an object), and the clipping and setup unit 450 is arranged for performing clipping or setup operations (e.g. clipping along a boundary, or for the coefficients of edge equations of a triangle). Additionally, the unified rasterizer 460PIXEL is arranged for performing pixel rasterizing operations, and the second set of unified shaders 430PS-1 is arranged for performing pixel shading, in order to store pixel data (e.g. color information and depth (Z) information) into the pixel buffer 20. Further, the shared cache 480 can be configured to be suitable for the operations of the IMM configuration 400IMM, and more particularly, can be configured to comprise an attribute cache, a depth cache, and a color cache. For brevity, similar descriptions for this embodiment are not repeated in detail here.

Figure 8:
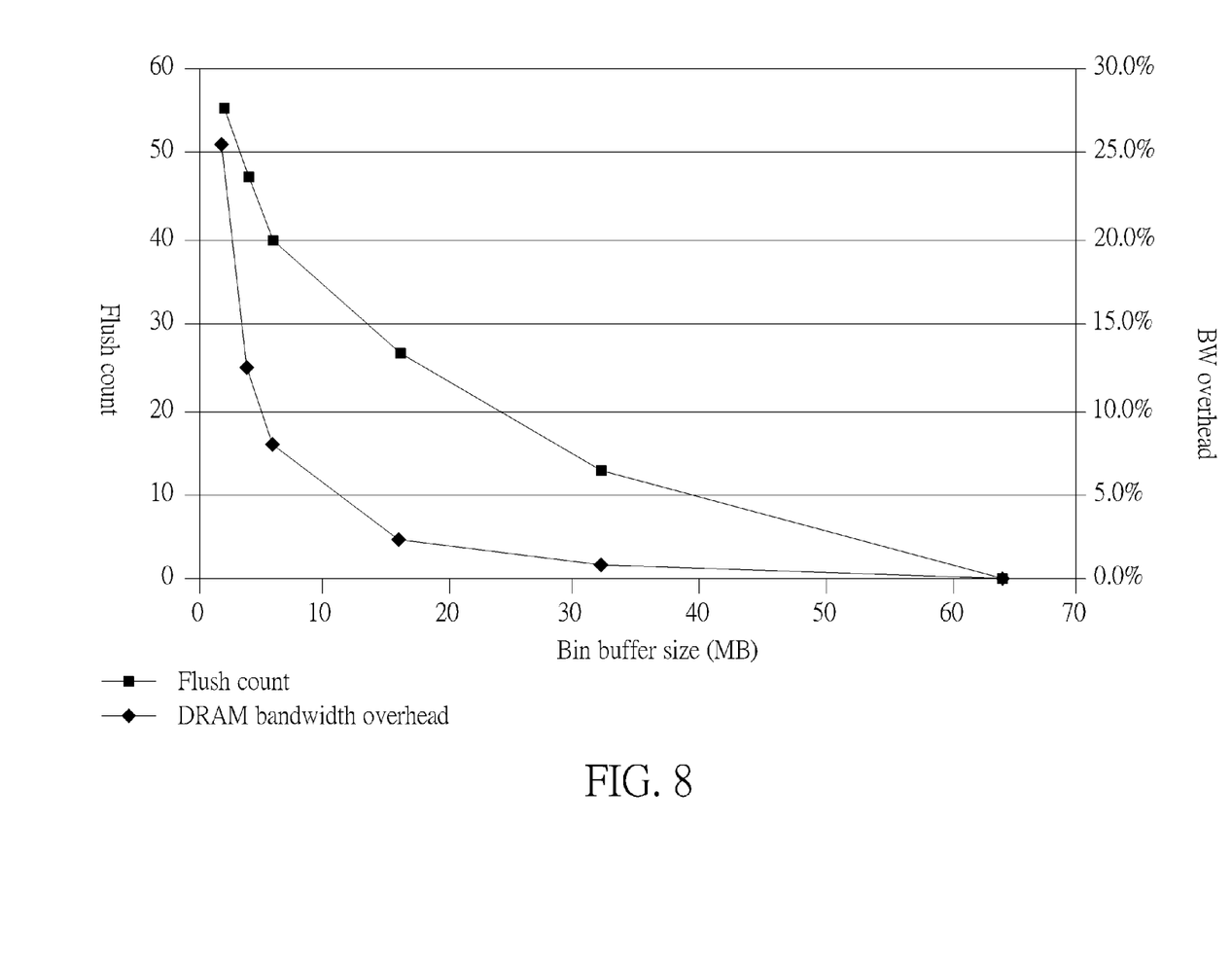
FIG. 8 illustrates a set of curves involved with the method shown in FIG. 2 according to an embodiment of the present invention.

FIG. 8 illustrates a set of curves involved with the method 200 shown in FIG. 2 according to an embodiment of the present invention. Please note that one curve of the set of curves indicates the relationship between the flush count and the varying buffer size, which can be measured in unit of Megabyte (MB). In addition, another curve of the set of curves indicates the relationship between the bandwidth (BW) overhead (more particularly, the DRAM bandwidth overhead and the bin buffer size, which can be measured in unit of MB.

According to this embodiment, the method 200 and the associated apparatus 100 can save costs. In addition, the method 200 and the associated apparatus 100 can save memory usage for the bin buffer. Additionally, the method 200 and the associated apparatus 100 can reduce the flush count and the bandwidth.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing graphics processing of a graphics system in an electronic device, the method comprising the steps of:

configuring a configurable hardware circuit of the graphics system to be a vertex processing (VP) path in a specific processing phase, wherein the configurable hardware circuit comprises a vertex loader, a plurality of unified shaders, a culling unit, a clipping and setup unit, a unified rasterizer, a binning processor, and a shared cache that are arranged for performing tile-based rendering (TBR) operations;

utilizing the VP path to perform VP-related TBR operations;

configuring the configurable hardware circuit of the graphics system to be a pixel processing (PP) path in another processing phase; and utilizing the PP path to perform PP-related TBR operations;

wherein the VP path and the PP path are different from each other; and in a situation where the configurable hardware circuit is configured to be the VP path, the VP path starts from a vertex buffer within the electronic device, passes through the vertex loader, the plurality of unified shaders, the culling unit, the clipping and setup unit, the unified rasterizer, and the binning processor, and reaches a bin buffer within the electronic device.

2. The method of claim 1, wherein after performing VP-related TBR operations of a specific frame is completed, PP-related TBR operations of the specific frame are performed; and after performing the PP-related TBR operations of the specific frame is completed, VP-related TBR operations of another frame are performed.

3. The method of claim 2, wherein after performing the VP-related TBR operations of the other frame is completed, PP-related TBR operations of the other frame are performed; and after performing the PP-related TBR operations of the other frame is completed, VP-related TBR operations of yet another frame are performed.

4. The method of claim 1, wherein the VP-related TBR operation of a specific frame and the PP-related TBR operation of another frame are not performed at a same time.

5. The method of claim 1, wherein the VP-related TBR operations comprise vertex computation operations, and further comprise tiling or binning operations; and the PP-related TBR operations comprise pixel computation operations.

6. The method of claim 1, wherein the step of configuring the configurable hardware circuit of the graphics system to be the VP path further comprises:
during processing a specific frame, configuring the configurable hardware circuit of the graphics system to be the VP path.

7. The method of claim 6, wherein the step of utilizing the VP path to perform the VP-related TBR operations further comprises:
during processing the specific frame, utilizing the VP path to perform the VP-related TBR operations of the specific frame.

8. The method of claim 7, wherein the step of configuring the configurable hardware circuit of the graphics system to be the PP path further comprises:
during processing the specific frame, configuring the configurable hardware circuit of the graphics system to be the PP path.

9. The method of claim 8, wherein the step of utilizing the PP path to perform the PP-related TBR operations further comprises:
during processing the specific frame, utilizing the PP path to perform the PP-related TBR operations of the specific frame.

10. An apparatus for performing graphics processing of a graphics system in an electronic device, the apparatus comprising at least one portion of the electronic device, the apparatus comprising:
a configurable hardware circuit, arranged for performing tile-based rendering (TBR) operations, wherein the configurable hardware circuit comprises a vertex loader, a plurality of unified shaders, a culling unit, a clipping and setup unit, a unified rasterizer, a binning processor, and a shared cache that are arranged for performing the TBR operations; and
a control circuit, coupled to the configurable hardware circuit, arranged for configuring the configurable hardware circuit of the graphics system to be a vertex processing (VP) path in a specific processing phase, utilizing the VP path to perform VP-related TBR operations, configuring the configurable hardware circuit of the graphics system to be a pixel processing (PP) path in another processing phase, and utilizing the PP path to perform PP-related TBR operations;
wherein the VP path and the PP path are different from each other; and in a situation where the configurable hardware circuit is configured to be the VP path, the VP path starts from a vertex buffer within the electronic device, passes through the vertex loader, the plurality of unified shaders, the culling unit, the clipping and setup unit, the unified rasterizer, and the binning processor, and reaches a bin buffer within the electronic device.

11. The apparatus of claim 10, wherein after performing VP-related TBR operations of a specific frame is completed, PP-related TBR operations of the specific frame are performed; and after performing the PP-related TBR operations of the specific frame is completed, VP-related TBR operations of another frame are performed.

12. The apparatus of claim 11, wherein after performing the VP-related TBR operations of the other frame is completed, PP-related TBR operations of the other frame are performed; and after performing the PP-related TBR operations of the other frame is completed, VP-related TBR operations of yet another frame are performed.

13. The apparatus of claim 10, wherein the VP-related TBR operation of a specific frame and the PP-related TBR operation of another frame are not performed at a same time.

14. The apparatus of claim 10, wherein the VP-related TBR operations comprise vertex computation operations, and further comprise tiling or binning operations; and the PP-related TBR operations comprise pixel computation operations.

15. The apparatus of claim 10, wherein during processing a specific frame, the control circuit configures the configurable hardware circuit of the graphics system to be the VP path; during processing the specific frame, the control circuit utilizes the VP path to perform the VP-related TBR operations of the specific frame; during processing the specific frame, the control circuit configures the configurable hardware circuit of the graphics system to be the PP path; and during processing the specific frame, the control circuit utilizes the PP path to perform the PP-related TBR operations of the specific frame.

16. The apparatus of claim 15, wherein during processing another frame, the control circuit configures the configurable hardware circuit of the graphics system to be the VP path; during processing the other frame, the control circuit utilizes the VP path to perform VP-related TBR operations of the other frame; during processing the other frame, the control circuit configures the configurable hardware circuit of the graphics system to be the PP path; and during processing the other frame, the control circuit utilizes the PP path to perform PP-related TBR operations of the other frame.

17. An apparatus for performing graphics processing of a graphics system in an electronic device, the apparatus comprising at least one portion of the electronic device, the apparatus comprising:
a configurable hardware circuit, arranged for performing tile-based rendering (TBR) operations, wherein the configurable hardware circuit further comprises a vertex loader, a plurality of unified shaders, a culling unit, a clipping and setup unit, a unified rasterizer, a binning processor, and a shared cache that are arranged for performing the TBR operations; and
a control circuit, coupled to the configurable hardware circuit, arranged for configuring the configurable hardware circuit of the graphics system to be a vertex processing (VP) path in a specific processing phase, utilizing the VP path to perform VP-related TBR operations, configuring the configurable hardware circuit of the graphics system to be a pixel processing (PP) path in another processing phase, and utilizing the PP path to perform PP-related TBR operations;
wherein the VP path and the PP path are different from each other; and in a situation where the configurable hardware circuit is configured to be the PP path, the PP path starts from a bin buffer within the electronic device, passes through the binning processor, the clipping and setup unit, the unified rasterizer, and the plurality of unified shaders, and reaches a pixel buffer within the electronic device.

18. The apparatus of claim 10, wherein the graphics system is a graphics processing unit (GPU); and the configurable hardware circuit is a GPU hardware circuit.

* * * * *